(12) United States Patent
Anstey et al.

(10) Patent No.: US 7,093,406 B2
(45) Date of Patent: Aug. 22, 2006

(54) METHOD FOR PRODUCING A WRAPPED BALE

(75) Inventors: Henry Dennis Anstey, Ottumwa, IA (US); Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/226,144

(22) Filed: Sep. 14, 2005

(65) Prior Publication Data

US 2006/0005512 A1 Jan. 12, 2006

Related U.S. Application Data

(62) Division of application No. 10/434,048, filed on May 8, 2003.

(51) Int. Cl.
*B65B 11/00* (2006.01)
*A01F 15/07* (2006.01)

(52) U.S. Cl. .......................... 53/397; 53/587; 56/341; 206/83.5

(58) Field of Classification Search ................ 53/397, 53/399, 587–589; 100/1–34, 76–89; 206/83.5; 56/341; A01F 15/07
See application file for complete search history.

(56) References Cited

U.S. PATENT DOCUMENTS

| | | | | |
|---|---|---|---|---|
| 4,570,789 A | * | 2/1986 | Fritz et al. ................ 206/83.5 |
| 4,703,605 A | * | 11/1987 | Ackermann .................. 53/118 |
| 4,821,785 A | * | 4/1989 | Rolan ........................ 150/166 |
| 4,838,016 A | * | 6/1989 | Frogbrook et al. ........... 53/118 |
| 4,917,008 A | * | 4/1990 | van den Wildenberg ...... 53/118 |
| 5,215,191 A | * | 6/1993 | Wright ..................... 206/83.5 |
| 5,359,810 A | * | 11/1994 | Aul ............................. 47/84 |
| 5,623,812 A | * | 4/1997 | Todt ........................... 53/442 |
| 6,017,405 A | * | 1/2000 | Pankoke ..................... 156/62.2 |
| 6,061,986 A | * | 5/2000 | Canada ........................ 52/561 |
| 6,425,322 B1 | * | 7/2002 | Karlsson et al. ................ 100/5 |
| 6,984,431 B1 | * | 1/2006 | Mass et al. ................. 206/83.5 |

FOREIGN PATENT DOCUMENTS

| | | | | |
|---|---|---|---|---|
| DE | 2846650 | A | * | 6/1980 |
| DE | 3525294 | A | * | 1/1987 |
| DE | 4020497 | A | * | 1/1992 |
| EP | 0233471 | A | * | 8/1987 |

* cited by examiner

*Primary Examiner*—Stephen F Gerrity

(57) ABSTRACT

Disclosed is a large round bale wrapped with a protective covering for permitting it to be stored outside. The covering is constructed of one or more layers of semi-permeable material. It is possible for an additional layer to be added to a region of the baler to be placed on the ground during storage, this additional layer resulting in the covering becoming essentially non-permeable in the region of the additional layer. A baler for applying the covering to a bale is disclosed together with a device for placing a visual marker on the bale so as to aid a person handling a discharged bale in knowing where the region covered with the additional layer of material is located so that this region may be manipulated into ground contact for storage.

3 Claims, 3 Drawing Sheets

1

METHOD FOR PRODUCING A WRAPPED BALE

CROSS-REFERENCE TO RELATED APPLICATION

This application is a division of applicant's co-pending application U.S. Ser. No. 10/434,048, filed May 8, 2003 and titled LARGE ROUND BALE WRAPPED IN PROTECTIVE WRAPPING AND METHOD FOR PRODUCING SUCH A WRAPPED BALE, which application is pending.

FIELD OF THE INVENTION

The present invention relates to protecting bales from the deteriorating affects of an outdoor environment, and more specifically relates to protective coverings for bales.

BACKGROUND OF THE INVENTION

One widespread method of storing forage crops is to package them in large cylindrical bales. Much of the appeal of this practice comes from the bales' inherent ability to shed rainfall and other elements. Contrary to widely held perceptions however, losses due to weather exposure on round bales are quite high. In research trials carried out in the eastern United States, large round bales stored outside without protection for six months or more were commonly found to experience dry matter losses of 30 percent or greater.

Numerous solutions to reduce these storage losses have been proposed, with various degrees of success. These solutions include wrapping the circumference of a bale with twine or plastic net or film material, covering the top of the bale with plastic "caps", or the complete envelopment of the bale in plastic film. None of these methods work to reliably prevent crop loss in dry hay baling, but the complete envelopment process has shown to be successful in baling high moisture hay or silage.

Concerning crop loss in dry hay baling, absorption of rainfall and/or wicking of soil moisture creates most losses due to spoilage, mold, etc. Losses from complete or circumferential solid film wrapping results from internal moisture trying to escape from the relatively dry hay, then condensing as it hits the plastic. This condensed moisture results in exterior portions of the bale remaining damp for extended periods of time, causing spoilage in these outer layers. Such spoilage has been shown to be similar to unprotected bales in some studies.

The problem to be solved then is to provide a protective covering for a bale which effectively prevents crop loss from the environment while being cost effective.

SUMMARY OF THE INVENTION

According to the present invention, there is provided a covering for a bale which overcomes the problems of the prior art coverings.

An object of the invention is to provide a wrapping which will shed essentially all liquid water while allowing water vapor given off by the crop to escape freely without condensation. Materials for accomplishing this are commonly referred to as being semi-permeable and include thin films of certain plastics, micro perforated plastic film, Tyvek®, Gortex®, and other woven or bonded fiber materials. In many, perhaps essentially all cases, application of at least one wrap of semi-permeable material should protect the exterior of the bale of crop from water penetration while allowing the water vapor leaving the crop to escape freely.

It is another object of the invention to provide a bale covering which will provide additional protection to the bottom of the bale from the possibility of ground water or soil surface moisture. This is done by providing an area of overlapped wrapping material or other means of making the bottom portion of the wrap essentially impermeable to moisture. The permeability of some plastic materials diminishes with the number of layers and/or the thickness of the plastic sheets. In the case of micro perforated plastic sheets, the permeability depends on the number and size of the perforations and diminishes with additional layers because of the misalignment of perforations. Therefore, it is proposed that when micro perforated plastic sheeting is used, the region of the bale, which is to be in ground contact, would be wrapped with an additional layer of plastic with the combined layers of plastic resulting in a covering which is essentially impermeable to moisture.

When an additional layer of wrapping material is placed on the bale in a region of the bale that is to be placed onto the ground, it may be desirable to mark the bale in a region opposite to that to be placed in ground contact so as to aid in the bale being moved, either by the bale discharge arrangement or by a device separate from the baler, to the correct position for storage.

These and other objects of the invention will be evident from a reading of the ensuing description together with the appended drawings.

DESCRIPTION OF THE PREFERRED EMBODIMENT

Figure 1:
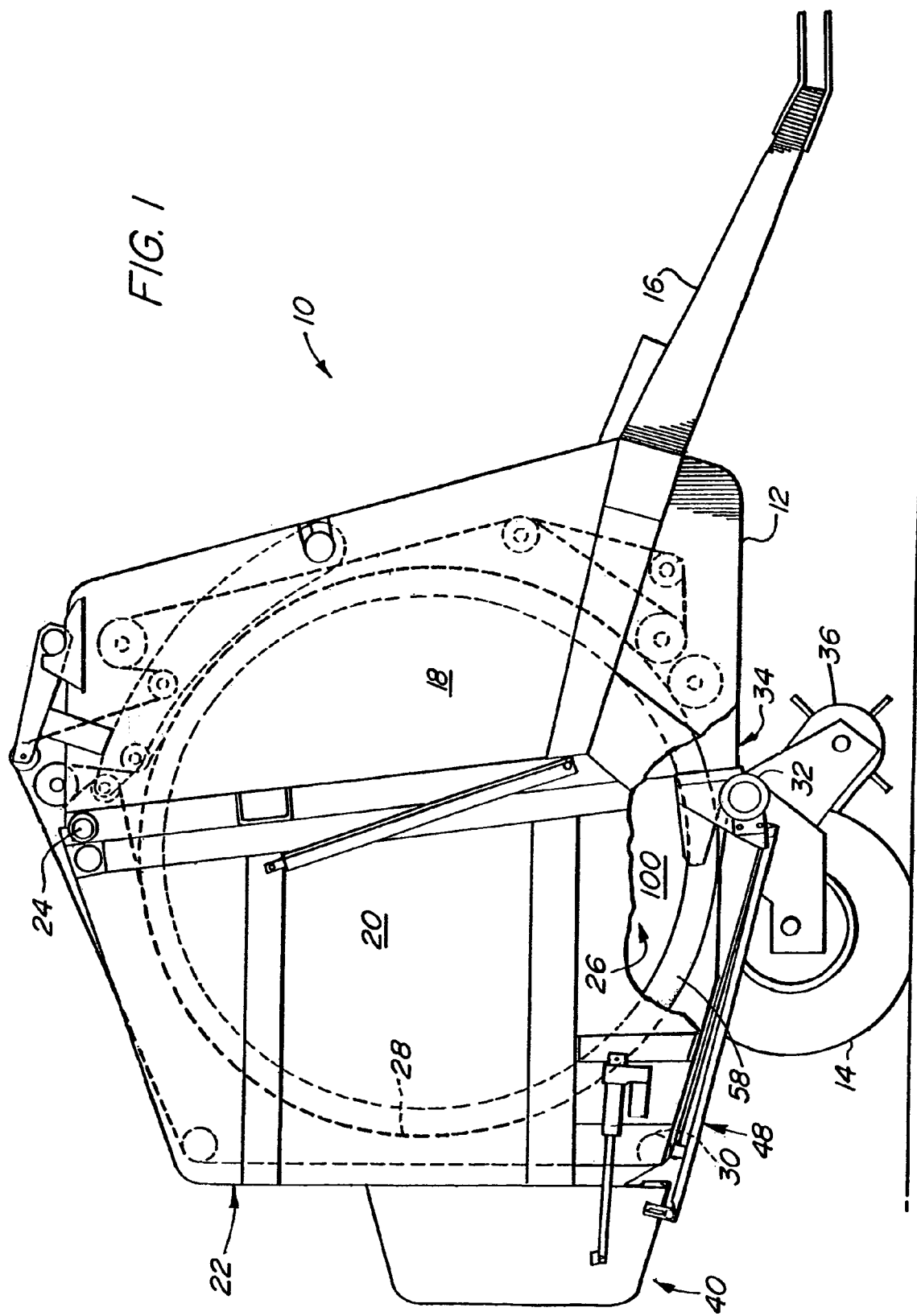
FIG. 1 is a somewhat schematic right side elevational view of a large round baler equipped with a bale wrapping mechanism for applying a covering in accordance with the principles of the present invention.

Referring now to FIG. 1, there is shown a large round baler 10 equipped with a bale wrapping device 40 for wrapping a bale 100.

The baler 10 includes a main frame 12 supported on a pair of ground wheels 14. A tongue 16 is fixed to, and projects forwardly from, the frame 12. An agricultural tractor (not shown) would normally be coupled to the front end of the tongue 16 for towing the baler 10 along windows of crop to be baled. The frame 12 includes a pair of transversely spaced sidewalls 18 terminating in respective upright rear edges. Mating with the upright edges of the sidewalls 18 are respective upright front edges of a pair of transversely spaced sidewalls 20 forming part of a bale discharge gate 22 having an upper forward region that is mounted, by a pivot assembly 24, to an upper rear location of the sidewalls 18 for establishing a horizontal transverse axis about which the discharge gate 22 is pivoted between a lowered working position, as shown, and a raised discharge position, for permitting the bale 100 to drop onto the ground. Cooperating with the fixed sidewalls 18 and the discharge gate sidewalls 20, so as to define an expansible baling chamber 26, are a plurality of bale-forming belts 28 disposed in a side-by-side arrangement across the width of a plurality of belt support rolls, some of which extend between the fixed sidewalls 18 and some of which extend between the discharge gate sidewalls 20. For the purposes of this application, the only belt support rolls assigned reference numerals are lower rear gate roll 30 and lower front gate roll 32. The belts 28, where they engage the lower front gate roll 32, define the rear side of a baling chamber crop inlet 34. A crop pick-up unit 36 is carried by the main frame 12 in a location for conveying crop into the inlet 34.

Figure 2:
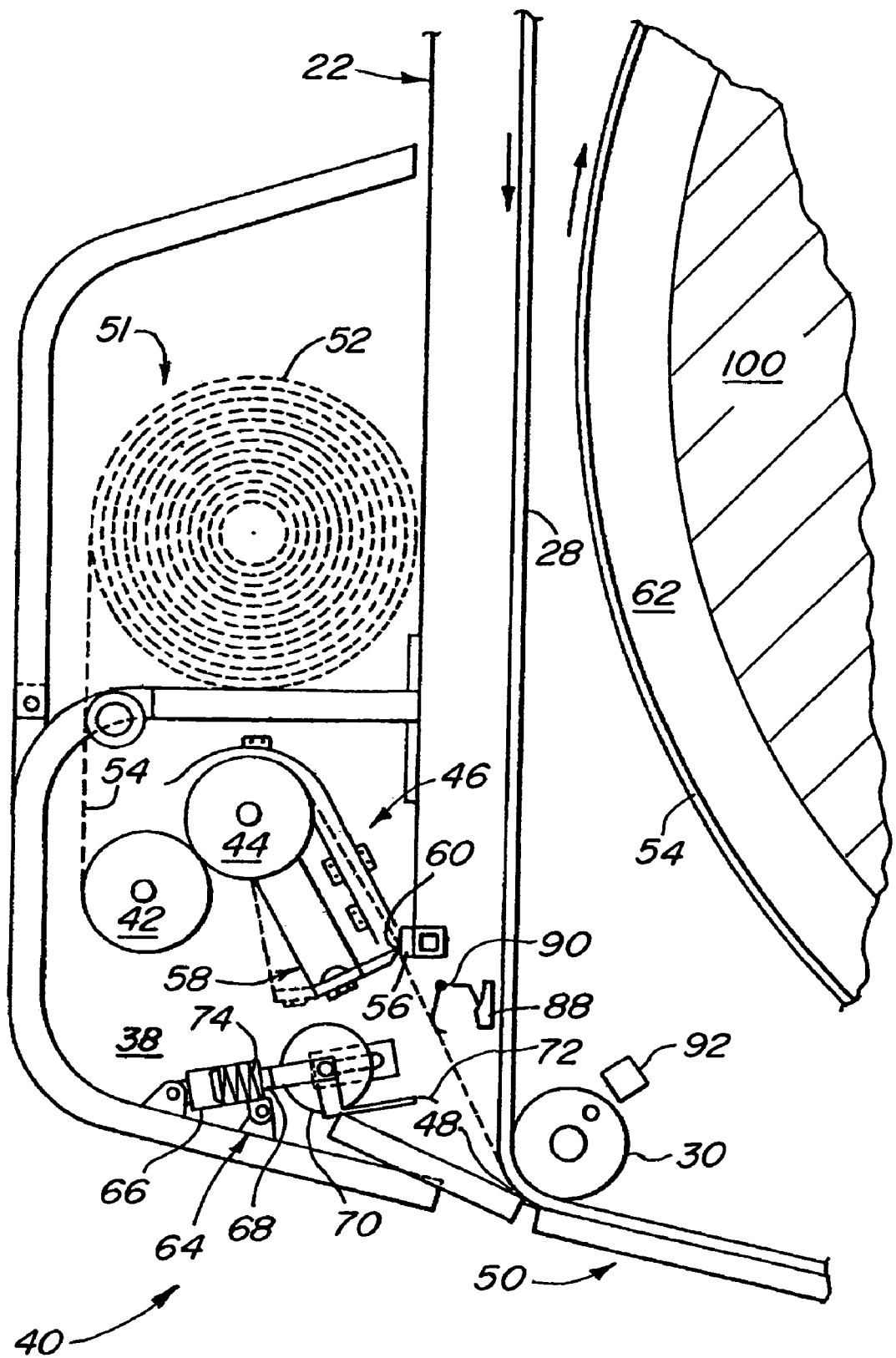
FIG. 2 is a right side elevational view of the rear portion of the baler of FIG. 1 showing structure operative for applying a visual marker to a bale during the wrapping process.

The bale wrapping device 40 is mounted to the rear and underside of the bale discharge gate 22. Referring now also to FIG. 2, it can be seen that the wrapping device 40 includes lower and upper feed rolls 42 and 44, respectively, with the upper feed roll 44 being located forwardly of the feed roll 42. A wrapping material directing arrangement 46 is provided for directing the wrapping material toward a nip 48 defined between the belts 28, where they engage a lower rear region of the lower rear gate roll 30 and a wrapping material guide assembly 50 positioned beneath, and having an upper guide surface in contact with a lower side of a run of the belts 14 extending fore-and-aft between the lower rear gate roll 30 and the lower front gate roll 32.

A supply roll 51 of wrapping material 52 is supported at a location above the feed rolls 46 and 48. A length of wrapping material 54 extends downwardly from a rear side of the supply roll 51, about a lower region of the rear feed roll 42, through the nip of the feed rolls 42 and 44, about the upper region of the feed roll 44, and down through the material directing arrangement 46. Adjacent the lower end of the material directing arrangement 46, a shear bar 56, preferably constructed of a relatively hard synthetic plastic or rubber material, is mounted such that it extends transversely across the rear of the discharge gate 22. A knife assembly 58 is mounted for pivoting about the rotational axis of the upper feed roll 44 and has a knife edge 60 disposed parallel to the shear bar 56 and located for pressing the length of wrapping material 54 against the shear bar 56 for separating the wrapping material that is being wrapped on a bale from the supply roll 51 when the knife assembly 58 is caused to move from its stand-by position, shown in dashed lines, to its cutting position, shown in solid lines, at the end of the wrapping cycle or process. The length of wrapping material 54 is shown at an instant just prior to being severed wherein it extends along the guide surface of the guide assembly 50 and into the baling chamber 26 where it is caught between the bale 100 and the bale-forming belts 28. While not necessary for the present invention, the baler 10 and wrapping device disclosed here are constructed so as to respectively accommodate and feed wrapping material which is wider than the baling chamber 26 so that the wrapping material 54 is folded over the opposite ends of the bale 100, as shown at 62. For the details of such a baler and wrapping device, one may refer to U.S. Pat. No. 5,974,764.

Depending on the characteristics of the particular semi-permeable wrapping material 54 used, a different number of layers of the material may be required to obtain the protection desired. Further, in cases where the bottom region of the bale 100 is wrapped with an additional layer of material, it is desirable to know the location on the bale 100 where the additional layer of wrapping exists, so that the bale may be stored with this region on the ground. For the purpose of accomplishing this, the baler 10 is equipped with a marking device 64 located centrally between opposite sides of the bale discharge gate 22. The marking device 64 includes a single-acting hydraulic cylinder 66 having a piston rod 68 coupled to a dispenser for a roll of adhesive marking tape 70 having perforations (not shown) at evenly spaced locations along its length to make tape segments that are separable one from the other with very little resistance. An end of a segment of the marking tape 70 is exposed at 72 and is selectively pressed into engagement with the length of wrapping material by momentary actuation of the cylinder 66 during the time that the bale 100 is being wrapped. The cylinder 66 will remain actuated for a time sufficient for the tape 68 to enter the nip 48 and then will be deactivated, with a coil compression spring 74 located in the cylinder then acting to retract the piston rod which causes rearward movement of the tape roll 70 and the tearing off of the leading segment of the tape 70 from the remainder of the roll. The torn off segment then travels into the baler with the length of wrapping material 54 and is captured between the length of wrapping material 54 and the bale 100 and serves as a visual marker 76 (FIG. 4) to indicate where any extra layer of wrapping material 54 is located. Of course, this assumes that the wrapping material 54 is a clear plastic or other material through which the marker can be seen. Otherwise, the marking device 64 may be placed on the opposite side of the wrapping material 54 so that the marker 76 is on the exterior of the bale 100.

Figure 3:
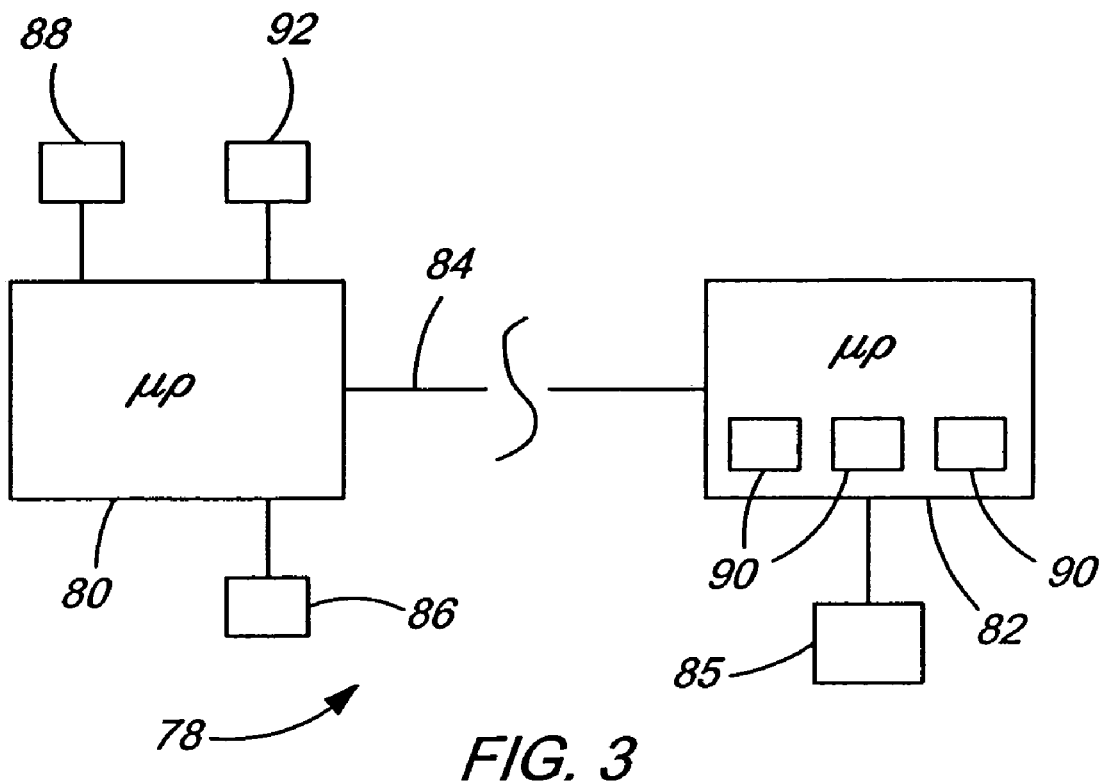
FIG. 3 is a schematic representation of a control system for controlling operation of the bale marking device.

For the sake of visibility, it is desired that the marker 76 be located diametrically opposite from the region where the extra layer of wrapping material 54 is located. This is achieved by timing the actuation of the cylinder 66 so that the marker 76 is adhered to the correct location on the wrapping material 54 as it passes by the marking device 64 during a given wrapping cycle for being located at the desired location on the bale 100. Referring now also to FIG. 3, there is shown a control system 78 including a first microprocessor 80, which is preferably mounted on the baler 10, a second microprocessor 82, preferably located on the towing tractor, a data link 84 connecting the two microprocessors 80 and 82 together, and a power supply 85, which may be the tractor battery or a separate battery, for example. The first microprocessor 80 serves a control function and is coupled to a solenoid-operated, two-position valve 86, that when de-energized, couples the marking device cylinder 66 to a sump, and when energized by a control signal, couples the marking device cylinder 66 to a source of fluid pressure. A switch 88 is mounted adjacent the path taken by the length of wrapping material 54 when the latter is fed into the nip 48, the switch 88 having an element 90 located for being contacted and moved by the tensioned material 54 so as to close the switch 88 and complete a circuit to an indicator so as to apprise the operator that a wrapping cycle has successfully begun. At the same time, a signal is provided to the microprocessor 80 which starts a countdown timer circuit. The time-out period of the countdown timer is dependent upon the size of the bale to be wrapped, the number of complete wraps of material to be placed on the bale before a partial wrap is applied, the distance between the nip 48 and the inside of the baling chamber 26 and the speed at which the wrapping material 54 is being fed into the baler. A number of key pads 90 are provided on the microprocessor 82 so that the information concerning the size of bale, the number of wraps to be applied, and the distance between the nip 48 and the baling chamber 26, can be keyed into memory. The speed of delivery of the wrapping material 54 to the baling chamber 26 is approximately that of the belts 28, which is determined by a speed sensor 92 located for determining the speed of rotation of the lower rear belt support roll 30. With this information, the microprocessor 80 calculates how long after receiving the signal resulting from closure of the switch 88, that the marking device cylinder 66 should be actuated to apply the visual marker 76 to the wrapping material 54.

Figure 4:
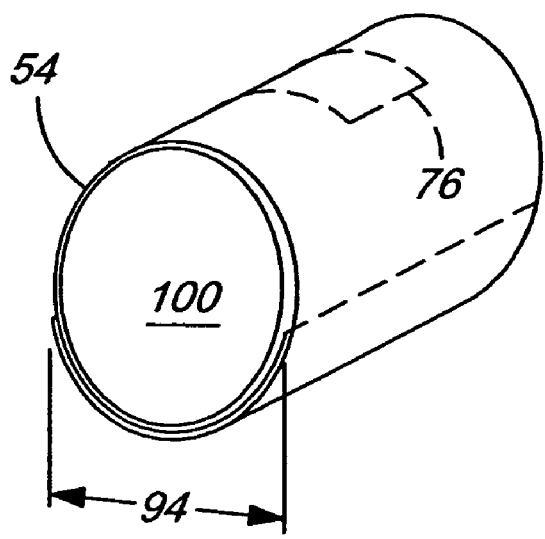
FIG. 4 is a perspective view of a large round bale wrapped in a semi-permeable material in accordance with the principles of the present invention.
Figure 5:
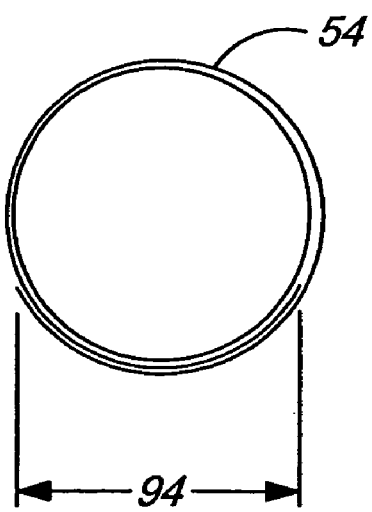
FIG. 5 is an end view of the bale illustrated in FIG. 4.

Referring now to FIGS. 4 and 5, there is shown a bale 100 wrapped with one complete layer of wrapping material 54 and including a bottom region 94 where a second layer of the wrapping material 54 is applied. This is the disposition of the bale for storage with the extra layer of material 54 affording extra protection to the bale from ground water or soil moisture. If after being discharged from the baler 10, the bottom region 94 is not at the bottom of the bale, the operator can easily determine this unwanted position of the bale by seeing the location of the visual marker 76. A correct positioning of the bale 100 can then be achieved by using a loader, or other appropriate equipment, to manipulate the bale 100 at a storage site so that the visual marker 76 appears at the top of the bale.

It should be understood that other ways of marking the bale 100 are possible. For example, a dye sprayer could be provided at the front of the baler 10 for applying a marking dye to a desired location of the circumference of the bale 100 prior to the desired location becoming covered with the material 54, with the control of the sprayer being similar to that of the marking device cylinder 66.

Having described the preferred embodiment, it will become apparent that various modifications can be made without departing from the scope of the invention as defined in the accompanying claims.

The invention claimed is:

1. A method of producing large round bales covered for protection against the elements when stored outside, comprising the steps of:
   a. providing a baler having a bale chamber surrounded in part by bale-forming elements for rolling up crop into a bale;
   b. providing a wrapping mechanism for introducing sheet wrapping material into the baler for enveloping at least a circumference of a formed bale with the wrapping material;
   c. loading a semi-permeable wrapping material for use with said wrapping mechanism, the semi-permeable wrapping material being one of a micro perforated plastic film, woven fiber or bonded fiber, the moisture permeability of which is diminished with additional layers; and
   d. operating said wrapping mechanism so as to apply at least one layer of wrapping material to the circumference of a bale located in said bale chamber and so as to apply an additional length of said wrapping material sufficient to additionally cover said bale in a pre-selected region of said bale; and
   e. manipulating said wrapped bale for storage, and placing said pre-selected region of said wrapped bale into ground contact, whereby said pre-selected region is additionally protected from ground water and soil moisture due to the diminished moisture permeability of the wrapping material in said pre-selected region.

2. The method, as defined in claim 1, and further including the step of marking said wrapping material so as to indicate where said pre-selected region is on said bale, said step of marking being perfomed automatically at a predetermined time after a wrapping cycle has been initiated for placing the marking at a location spaced diametrically opposite from said pre-selected region.

3. The method, as defined in claim 2, wherein the step of marking includes providing a roll of adhesive material and sticking a predetermined length of said material to said wrapping material during the process of wrapping said bale with said material.

\* \* \* \* \*